US012590892B2

(12) United States Patent
Krätschmer et al.

(10) Patent No.: US 12,590,892 B2
(45) Date of Patent: Mar. 31, 2026

(54) CALIBRATION VESSEL AND METHOD FOR CALIBRATION

(71) Applicant: Endress+Hauser Conducta GmbH+Co. KG, Gerlingen (DE)

(72) Inventors: Thilo Krätschmer, Gerlingen (DE); Matthias Großmann, Vaihingen-Enz (DE); Alexander Opolka, Karlsruhe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 299 days.

(21) Appl. No.: 18/531,664

(22) Filed: Dec. 6, 2023

(65) Prior Publication Data

US 2024/0192134 A1 Jun. 13, 2024

(30) Foreign Application Priority Data

Dec. 9, 2022 (DE) ...................... 10 2022 132 819.8

(51) Int. Cl.
*G01N 21/47* (2006.01)
*G01N 21/53* (2006.01)

(52) U.S. Cl.
CPC ....... *G01N 21/4785* (2013.01); *G01N 21/534* (2013.01)

(58) Field of Classification Search
CPC .. G01N 21/4785; G01N 21/534; G01N 21/51; G01N 21/03; G01N 21/01; G01N 21/15; G01N 2021/151; G01N 2021/152; G01N 2021/154
See application file for complete search history.

(56) References Cited

U.S. PATENT DOCUMENTS

| | | | | |
|---|---|---|---|---|
| 5,992,211 A | * | 11/1999 | Skrtic | A61B 5/1495 |
| | | | | 73/1.03 |
| 2016/0061646 A1 | * | 3/2016 | Mestivier | G01F 25/20 |
| | | | | 73/1.73 |

FOREIGN PATENT DOCUMENTS

| | | |
|---|---|---|
| DE | 7714670 U1 | 12/1977 |
| DE | 19723681 A1 | 12/1998 |
| DE | 19948990 A1 | 6/2000 |
| DE | 102010001391 A1 | 8/2011 |
| DE | 102010001876 A1 | 8/2011 |
| DE | 102011017535 A1 | 10/2012 |

(Continued)

*Primary Examiner* — Tarun Sinha
(74) *Attorney, Agent, or Firm* — Kelly J. Smith; Endress+Hauser (USA) Holding, Inc.

(57) ABSTRACT

The present disclosure discloses a calibration vessel for an optical immersion sensor to be calibrated, which is designed for measuring, calibrating and/or adjusting a measured variable. The calibration vessel includes a housing having a repeatably tightly sealable opening for introducing the optical immersion sensor. The housing provides a value for a calibration solution. The opening comprises a guide for aligning and positioning the optical immersion sensor to be calibrated in all possible spatial degrees of freedom, wherein the housing is designed such that the influence of the interactions between the light, emitted and received by the sensor, and the housing wall, in particular as a result of scattering, absorption, reflection, phosphorescence and fluorescence, on the measured value that can be ascertained by the sensor is minimal, wherein the volume of the calibration solution is minimized at the same time.

24 Claims, 6 Drawing Sheets

(56)         References Cited

FOREIGN PATENT DOCUMENTS

| DE | 102011080579 A1 | 2/2013 |
| DE | 102009046637 B4 | 8/2017 |
| DE | 102019135589 A1 | 6/2021 |
| DE | 102019135595 A1 | 6/2021 |
| DE | 102021112186 A1 | 11/2022 |

* cited by examiner

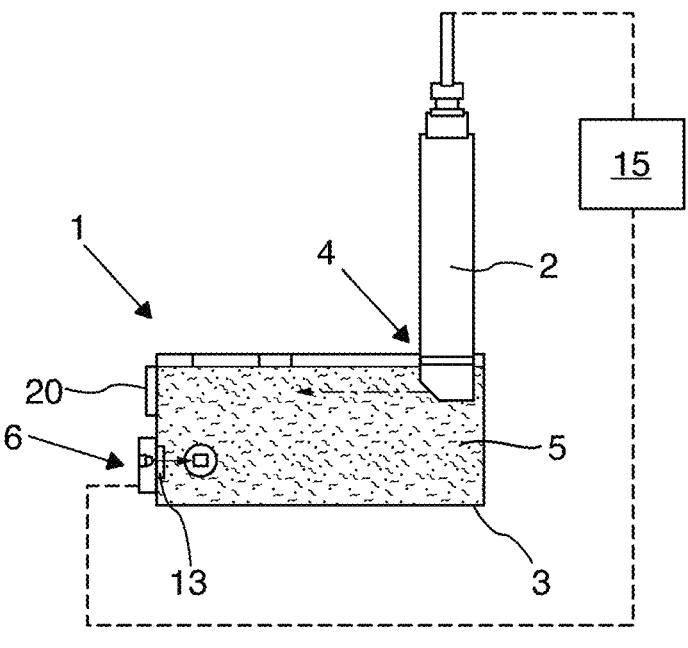
Fig. 1
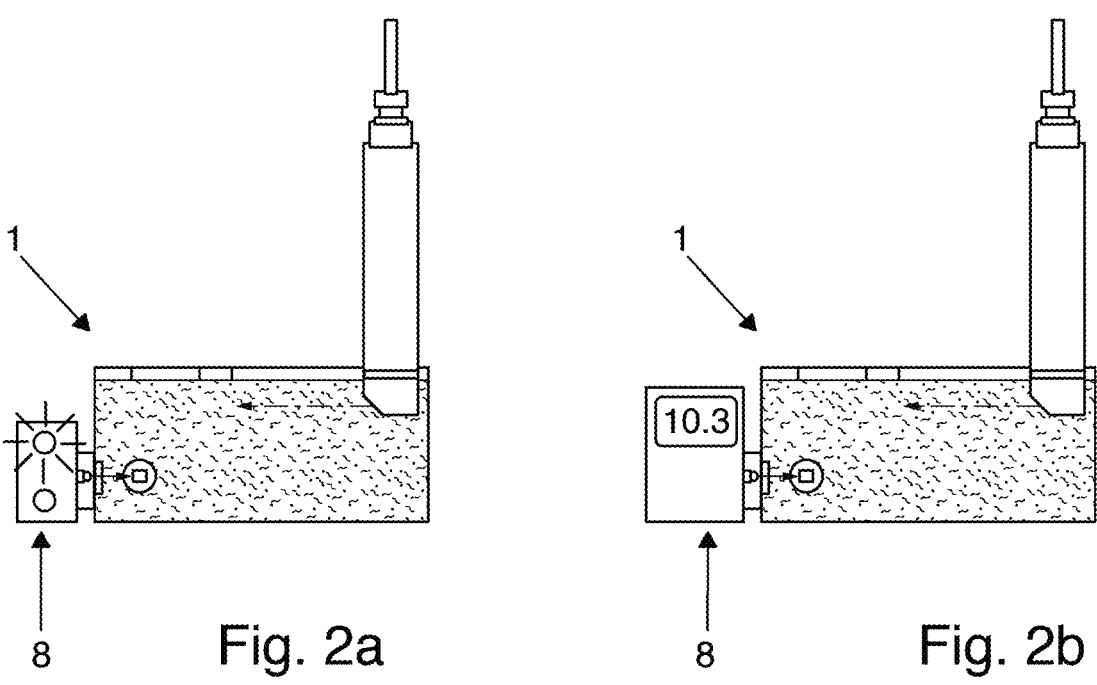
Fig. 2a                    Fig. 2b

Fig. 3a          Fig. 3b          Fig. 3c
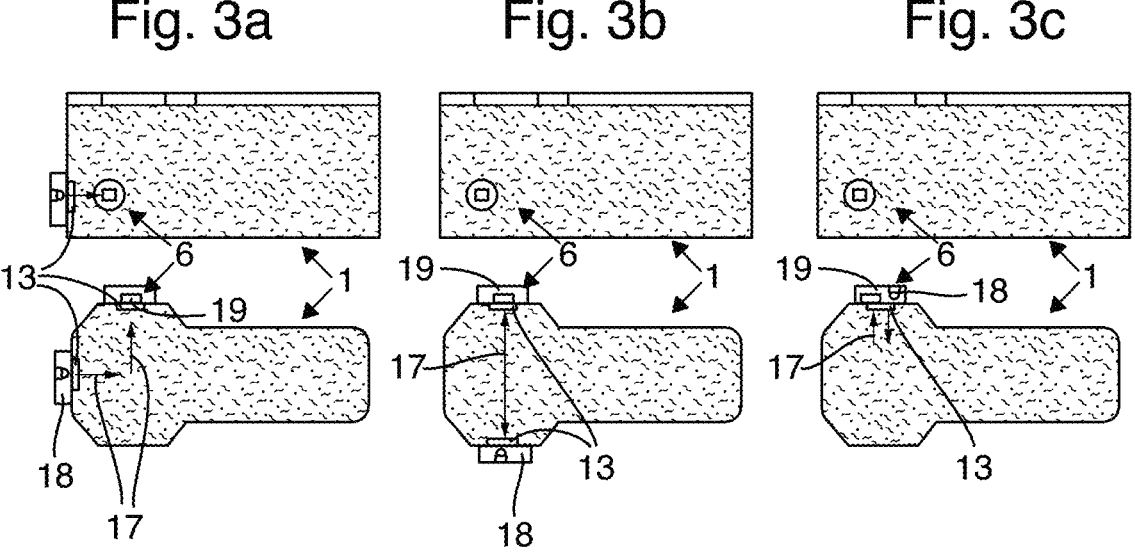
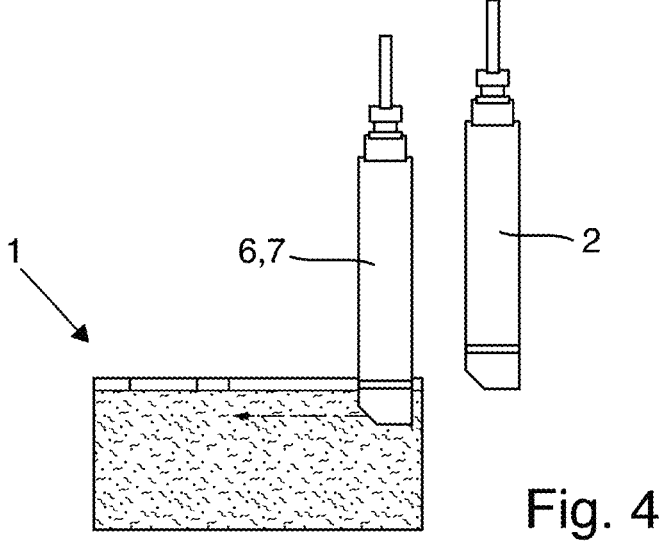
Fig. 4

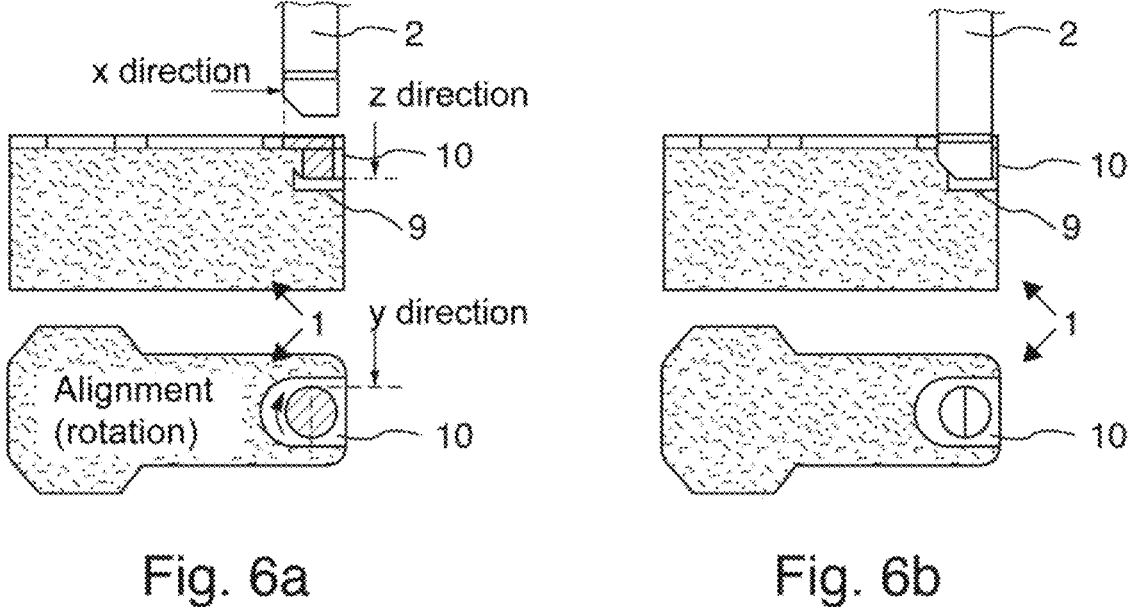
Fig. 6a                    Fig. 6b
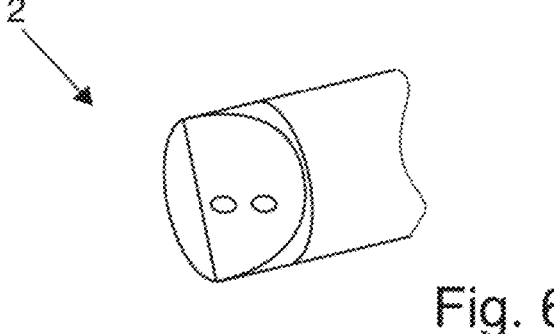
Fig. 6c

CALIBRATION VESSEL AND METHOD FOR CALIBRATION

CROSS-REFERENCE TO RELATED APPLICATION

The present application is related to and claims the priority benefit of German Patent Application No. 10 2022 132 819.8, filed on Dec. 9, 2022, the entire contents of which are incorporated herein by reference.

TECHNICAL FIELD

The present disclosure relates to a calibration vessel for an immersion sensor and to a method for calibrating such a sensor.

BACKGROUND

The problem addressed by the present disclosure is to be explained on the basis of the embodiment of the immersion sensor as a turbidity sensor and can be applied analogously to other optical sensors as embodiments of the immersion sensor.

Due to statutory regulations or specifications in the corresponding process industry, the function of turbidity sensors must be checked at certain intervals on the basis of a calibration. For example, according to the turbidity standard ISO 7027, the calibration or adjustment of the devices must be done with liquid primary standards, such as formazine, or an approved secondary standard, such as styrene-divinyl-benzene. These standards, which may sometimes also be harmful to health, are usually stored, in the case of laboratory turbidimeters or in the case of turbidity sensors that have a closed measuring chamber, in closed glass cuvettes, which are inserted into the measuring chamber of the turbidity meter for the purpose of calibration.

In contrast, for the purpose of calibration, immersion sensors for measuring turbidity must be immersed in the corresponding calibration solution so that at least the sensor optics are completely surrounded by the calibration liquid. For this purpose, the calibration solution is usually poured into a calibration vessel (beaker, basin, etc.). For example, the calibration vessels for sensor "CUS52D" by the applicant, which are sold under the designation "CUY52" in two different sizes, are known.

However, the turbidity value of the calibration solution as a reference value for the calibration may, on the one hand, either not be known—or may not be traceably documented with sufficient certainty. For example, the calibration solution may not have been produced according to the ISO 17034 standard required for the production of standards. On the other hand, the known turbidity value of a calibration solution produced according to the standard can be distorted, for example by contamination during the calibration of a plurality of sensors.

For reasons of efficiency, the amount of costly calibration solution required for calibration is to be minimized. However, the size of the basin cannot be reduced arbitrarily since reflection or backscattering on the basin walls can distort the measured value from the turbidity sensor to be calibrated and this error increases as the distance from the walls of the calibration vessel decreases.

SUMMARY

The present disclosure is generally based on the object of correctly calibrating a sensor simply, safely and repeatably.

The object is achieved by a calibration vessel for an optical immersion sensor to be calibrated, which is designed to measure, calibrate and/or adjust a measured variable, comprising a housing having a repeatably tightly sealable opening for introducing the optical immersion sensor, wherein the housing comprises a calibration solution in the interior thereof, wherein the housing provides the value of the calibration solution, wherein the opening comprises a guide for aligning and positioning the optical immersion sensor to be calibrated in relation to all possible spatial degrees of freedom, wherein the housing is designed such that the influence of the interactions between the light, emitted and received by the sensor, with the housing wall, in particular as a result of scattering, absorption, reflection, phosphorescence and fluorescence, on the measured value that can be ascertained by the sensor is minimal, wherein the volume of the calibration solution is minimized at the same time.

This results in high efficiency of the calibration process since a plurality of sensors can be calibrated or adjusted in the same calibration unit using only one calibration solution. According to the prior art, the calibration solution must be replaced after each calibration process. Minimizing the basin volume additionally saves expensive calibration solutions.

The sensor to be calibrated is also positioned and aligned in a simple and specific manner by the guide.

Furthermore, the claimed calibration vessel leads to improved operational safety during the calibration process by protecting the operator from contact with calibration solutions that are harmful to health.

One embodiment provides that the calibration vessel provides the value of the calibration solution by the value being specified on the calibration vessel or on the housing as a nominal value, in particular using a sticker.

One embodiment provides that the calibration vessel provides the value of the calibration solution by the absolute value of the calibration solution being detected using a reference device that can be connected to the calibration vessel and is designed to monitor the calibration solution for changes or deviations with respect to a reference value.

One embodiment provides that the reference device is an external sensor, in particular a further immersion sensor that is structurally identical to the optical immersion sensor to be calibrated, wherein said further immersion sensor is already calibrated.

One embodiment provides that the reference device is fixedly arranged on or in the calibration vessel.

One embodiment provides that the reference device is arranged on the outside of the housing.

One embodiment provides that the immersion sensor and the reference device have contact with the interior of the housing and thus the calibration solution via an optical window thereon.

One embodiment provides that the reference device is a turbidity meter designed as an absorption sensor.

One embodiment provides that the reference device is a turbidity meter designed for backscatter measurement, in particular comprising a light source, for example an LED, for emitting outgoing light and a photodiode integrated therein for receiving incoming light, wherein the outgoing light is converted into incoming light by the calibration solution.

One embodiment provides that the reference measuring device is a turbidity meter designed for 90° scattered light measurement.

One embodiment provides that the calibration vessel comprises a display unit, which is connected to the reference device and is designed to display the measured value for the measured variable ascertained by the reference device as changes or a deviation with respect to a reference value and/or a an absolute measured value; the display unit in particular comprises one or more LEDs or a display for displaying a numerical value.

One embodiment provides that the surfaces, angles, transitions, bevels and radii of the housing are designed such that light emitted by the turbidity sensor is refracted away therefrom.

One embodiment provides that the housing, in particular the interior of the housing, consists of a non-reflective, in particular black, non-glossy and/or matte, material.

One embodiment provides that the opening for introducing the immersion sensor comprises a guide having a stop, the guide being designed such that the immersion sensor is guided by the guide to the stop as an end position so that it is positively fixedly fixed, positioned and aligned in the stop in all three spatial directions.

One embodiment provides that the distance between the guide and the opposite wall is large enough that the wall does not influence the measured value.

One embodiment provides that the opening for introducing the immersion sensor comprises a sealing system having a cover, a film or a membrane.

One embodiment provides that the opening is designed to be repeatably sealable by means of the sealing system.

One embodiment provides that the sealing system comprising the cover, film or membrane is designed to be pierced before first use.

One embodiment provides that the calibration vessel comprises one or more cleaning units for the immersion sensor to be calibrated and/or the reference device, which in particular clean the optical window(s).

One embodiment provides that the cleaning units are designed as a wiper, brush, air cleaning system, ultrasonic cleaning system or as a combination thereof. The additional process of monitoring the calibration solution together with cleaning the optical windows, positioning the sensor in a defined position in the basin and stirring the calibration solution result in a simple, safe and easy-to-use calibration option which has high accuracy and reproducibility and which satisfies the requirements of customers and certification authorities due to the high quality of the calibration results.

One embodiment provides that the calibration vessel comprises a circulation system in the housing, in particular a stirrer, magnetic stir bar or the like, which is designed to circulate the calibration solution.

One embodiment provides that the calibration solution is a solution that does not settle and remains permanently suspended, for example, styrene-divinylbenzene.

One embodiment provides that the calibration vessel comprises a transmitter for controlling the calibration process and for performing an adjustment process, wherein the transmitter is connected to the reference device, in particular can also be connected to the immersion sensor, and for actuating the display unit, controlling the cleaning unit and/or controlling the circulation system.

One embodiment provides that the calibration vessel comprises a voltage supply, for example a battery, a rechargeable battery or an external voltage supply, for supplying the cleaning unit or the circulation system with energy.

The object is furthermore achieved by a method having an optical immersion sensor as described above, comprising the steps of: homogenizing, in particular circulating, the calibration solution in the calibration vessel, in particular during the entire method; determining the measured variable for the calibration medium using the reference device or by reading the value specified on the calibration vessel or the housing; determining the measured variable for the calibration medium using the immersion sensor; and calibrating and/or adjusting the immersion sensor by comparing the measured value of the reference device, or the value specified on the calibration vessel or the housing, with the measured value of the immersion sensor.

One embodiment provides that, before the step "determining the measured variable for the calibration medium using the reference device," the following step is performed: cleaning the reference device and/or the immersion sensor, in particular cleaning the optical window(s) for the reference device and/or the immersion sensor.

BRIEF DESCRIPTION OF THE DRAWINGS

This is explained in more detail with reference to the following figures.

FIG. 1 shows the claimed calibration vessel comprising a turbidity meter.

FIG. 2a/b show the claimed calibration vessel each comprising a display unit.

FIG. 3a-c show the claimed calibration vessel each comprising different turbidity meters.

FIG. 4 shows the claimed calibration vessel comprising an external sensor.

FIG. 6a-c show the claimed calibration vessel before and after the introduction of the turbidity meter.

Figure 5:
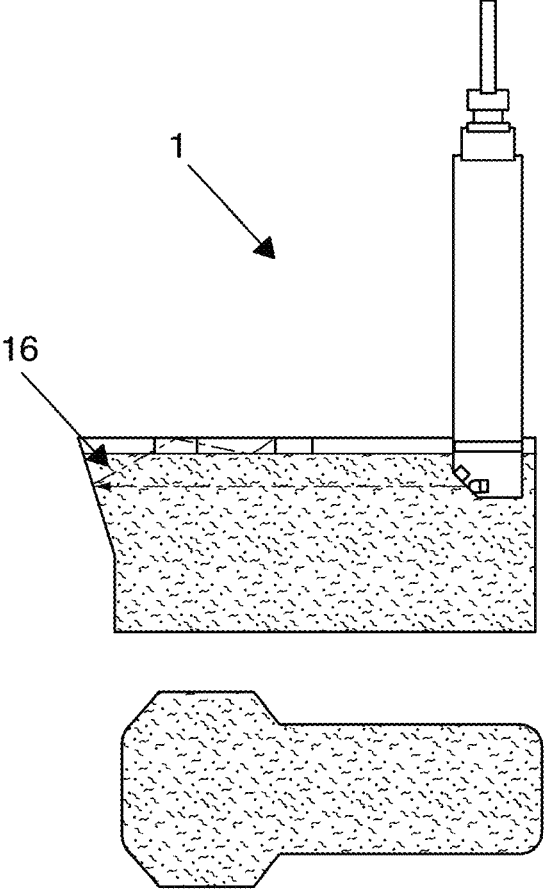
FIG. 5 shows the claimed calibration vessel comprising a light trap.

In the drawings, the same features are labeled with the same reference signs.

DETAILED DESCRIPTION

The claimed calibration vessel is denoted, as a whole, by reference sign 1 and is shown in FIG. 1.

The calibration vessel 1 is used to calibrate an optical immersion sensor 2. For this purpose, the calibration vessel 1 comprises calibration medium 5 in its interior. The immersion sensor 2 is, for example, a turbidity sensor, nitrate sensor, SAC (spectral absorption coefficient) sensor or a sensor for measuring polycyclic aromatic hydrocarbons (PAH) using fluorescence measurement. In general, an immersion sensor is a sensor designed for immersion in a measurement medium (e.g., liquid). The sensor thus determines the corresponding measured variable.

This calibration is designed such that it does not adversely affect or does not distort the measured value from the sensor 2 to be calibrated. More precisely, the housing 3 is designed such that the influence of the interactions between the light, emitted and received by the sensor 2, and the housing wall, in particular as a result of scattering, absorption, reflection, phosphorescence and fluorescence, on the measured value that can be ascertained by the sensor 2 is minimal. This is described below on the basis of various options.

As a first measure, the housing 3 comprises an opening 4 having a guide 10 for aligning and positioning the optical immersion sensor 2 to be calibrated in relation to all possible spatial degrees of freedom. This is described below with reference to FIG. 6*a* and *b*.

The turbidity meter 1 thus comprises the housing 3 which has an opening 4 for introducing the sensor 2 to be measured. The opening 4 can be repeatably tightly sealed; for example, the housing is designed as a beaker or canister and comprises a screwed-on cover, i.e., with a thread and a corresponding seal.

Calibration solution 5, for example formazine or styrene-divinylbenzene in the case of, for example, a turbidity measurement, is located in the housing 3. The housing 3 is designed such that the volume of the calibration solution 5 is minimized, for example for cost reasons or so that as little potentially harmful material as possible has to be provided. In other embodiments of the sensors, the calibration solution has a corresponding design.

An essential point is that the housing 3 provides the value for the calibration solution. This offers the user an easy and quick way of checking the calibration.

In one embodiment, the calibration vessel 1 provides the value for the calibration solution 5 by the value being specified on the calibration vessel 1 or on the housing 3 as a nominal value, in particular by means of a sticker 20.

In an additional or alternative embodiment, the calibration vessel 1 provides the value for the calibration solution 5 by the value for the calibration solution 5 being determined using a reference device 6 that can be connected to the calibration vessel 1.

The optical measured variable in the calibration vessel 1 is thus monitored by the optical reference device 6 that can be connected to the calibration vessel 1. The reference device 6 is designed to monitor the calibration solution 5 for changes or deviations with respect to a reference value or to detect the absolute value for the measured variable of the calibration solution 5.

There are various options for the design of the reference device 6. The reference device (6) is, for example, an external sensor 7, for example a further immersion sensor that is structurally identical to the immersion sensor 2 to be calibrated, wherein said further immersion sensor is already calibrated. It is likewise to use a sensor that is not structurally identical, provided that the sensor is already calibrated. In this respect, see FIG. 4 and the description below.

In one embodiment, the reference device 6 is fixedly arranged on or in the calibration vessel 1. In this respect, see FIG. 1 and the description below. For example, the reference device 6 is arranged on the outside of the housing 3. In the embodiment in which the reference device 6 is arranged on or in the calibration vessel 1, said reference device has contact with the interior of the housing 3 and thus with the calibration solution 5 via an optical window 13 thereon.

Both the optical immersion sensor 2 and the optical reference device 6 will be described below as turbidity sensors without loss of generality. Other embodiments are possible; see above.

This can either be the mere monitoring of a known turbidity value, i.e., the known turbidity value of a calibration solution is monitored only for changes or for deviations from predefined limit values, wherein the monitoring result is generally displayed by a display unit 8, for example, by an LED display green=good, red=poor. This is shown in FIG. 2*a*.

Alternatively, the measurement integrated in the basin can also be designed such that it measures the turbidity value of the calibration solution with such a degree of accuracy that the measured value can be used as a reference value for calibrating the sensor to be calibrated. In this case, the calibration vessel must be equipped with a display unit 8 for outputting the reference value. This is shown in FIG. 2*b*.

The display value can either be read by the user or be forwarded to the sensor 2 or a transmitter 15 via a potentially wireless data connection in order to automatically use the display value as a reference value for the calibration or adjustment process.

FIG. 1 shows a transmitter 15 connected to the sensor 2 and the turbidity meter 6 (indicated by dashed lines in FIG. 1). As mentioned, the display unit 8 can also be connected to the transmitter 15 (not shown in FIG. 2). The transmitter 15 is also designed to control the calibration process and perform an adjustment process, to control the cleaning units 12 (see below) and/or to control the circulation system 14 (see below).

Various embodiments of the turbidity meter 6 are shown in FIG. 3. The upper region of each of FIG. 3*a-c* shows a side view, and the lower region shows a plan view.

Depending on the degree of accuracy required for the integrated measurement, this measurement can be a simplified, cost-effective backscatter measurement (e.g., with a photodiode integrated into the transmitting LED; FIG. 3*c*), an absorption measurement (e.g., from one basin wall to the other; FIG. 3*b*) or a precise 90° scattered light measurement (FIG. 3*a*), which, for example, meets the requirements of the ISO 7027 turbidity standard. In general, light from a light source 18 is radiated into the calibration medium 5 via an optical window 13.

Within the meaning of this present disclosure, "light" is not to be limited to the visible range of the electromagnetic spectrum but is to be understood as electromagnetic radiation of any wavelength, in particular also in the far ultra-violet (UV) and in the infrared (IR) wavelength range. Accordingly, "light source" is to be understood as a radiation source.

The light is scattered, reflected or absorbed by particles and some of the light is received by a receiver 19. The path of the light is marked by arrows and reference sign 17. The turbidity can then be ascertained, for example from the intensity of the scattered light measured. The light source 17 and receiver 18 are connected to the transmitter 15.

The method of measuring the scattered light is to be discussed (FIG. 3*a*). In this embodiment, outgoing light 17 (arrow) is radiated from a light source 18 and into the interior of the housing 3 via a window 13, which is transparent with respect to the outgoing light 17. There, the light is scattered on particles in the medium 5 at a scattering point and at a measuring angle or is converted into incoming light 17 (arrow). Through a window 13 that is transparent with respect to the incoming light 17, the incoming light arrives at a receiver 19 through, for example, an aperture. The light intensity arriving at the receiver 19 is a measure of the turbidity.

In the embodiments in FIG. 3*a-c*, the turbidity meter 6 is fixedly arranged on or in the calibration vessel 1; more particularly, the turbidity meter 6 is arranged on the outside of the housing 2 and has contact with the interior of the housing 2, and thus the calibration solution 5, via an optical window 13 thereon.

Furthermore, depending on the target market, a different measuring principle or measuring method having a corresponding light source can be used. (e.g., IR measurement according to ISO 7027 for the EU market or EPA white light measurement for the US).

As an alternative to the described turbidity measurement integrated into the calibration vessel 1, the calibration solution can also be checked or measured using an external turbidity sensor 7; see FIG. 4. In this case, the use of a sensor whose geometry or outer contour is structurally identical to that of the sensors 2 to be calibrated would be particularly advantageous, since such a sensor can be positioned at the identical installation location in the calibration vessel 1 by means of the same receptacle and thus under identical environmental conditions to the sensors 2 to be calibrated. The measurement performance or measurement accuracy of this external reference sensor can be increased by additional calibration methods (additional calibration points, calibration only with standards according to ISO 17034, etc.) in order to qualify this sensor as a "golden sample sensor" for the reference measurement and to distinguish it from the sensors 2 to be calibrated.

The object of minimizing the volume of the calibration vessel 1 and thereby also minimizing the need for calibration solution is achieved by a combination of various measures. The calibration vessel 1 is to be designed such that, despite having the smallest possible volume, no measurement errors result due to interfering influences on the vessel walls (=wall effects).

The surfaces, angles, transitions, bevels, radii, etc. of the calibration vessel 1 are structurally designed such that the light emitted by the sensor optics is not backscattered onto the detector of the turbidity meter 6 but is refracted away from the sensor optics (light trap principle). The calibration vessel 1 itself is thus designed as a light trap so that the influence of the radiation from the turbidity sensor 2 reflected on the wall of the calibration vessel on the measured value is minimized. This is indicated by the light beams 16. In this respect, see FIG. 5.

The design is based for example on simulations, the results of which are checked using measurements.

The use of a non-reflective (non-glossy/matte, for example black) material additionally reduces reflections and backscattering on the walls of the calibration vessel.

The sensors 2 to be calibrated are received in a position in the calibration vessel that is as specific as possible and is always the same by a receptacle which is integrated in the calibration vessel and has a stop 9 and a guide 10. FIG. 6a shows the situation prior to the introduction of the sensor 2; FIG. 6b shows it after the introduction of said sensor. In this case, the sensor 2 interlockingly latches in this receptacle and is received in a predefined position in the x, y and z direction by stops. The specific alignment of the angle of rotation is performed by means of the oblique surface on the sensor head according to the Poka-Yoke principle. FIG. 6c shows the sensor head.

As a further measure, the housing 3 is designed such that the distance between the guide 10 and the opposite wall is large enough that the wall does not influence the measured value.

Figure 7:
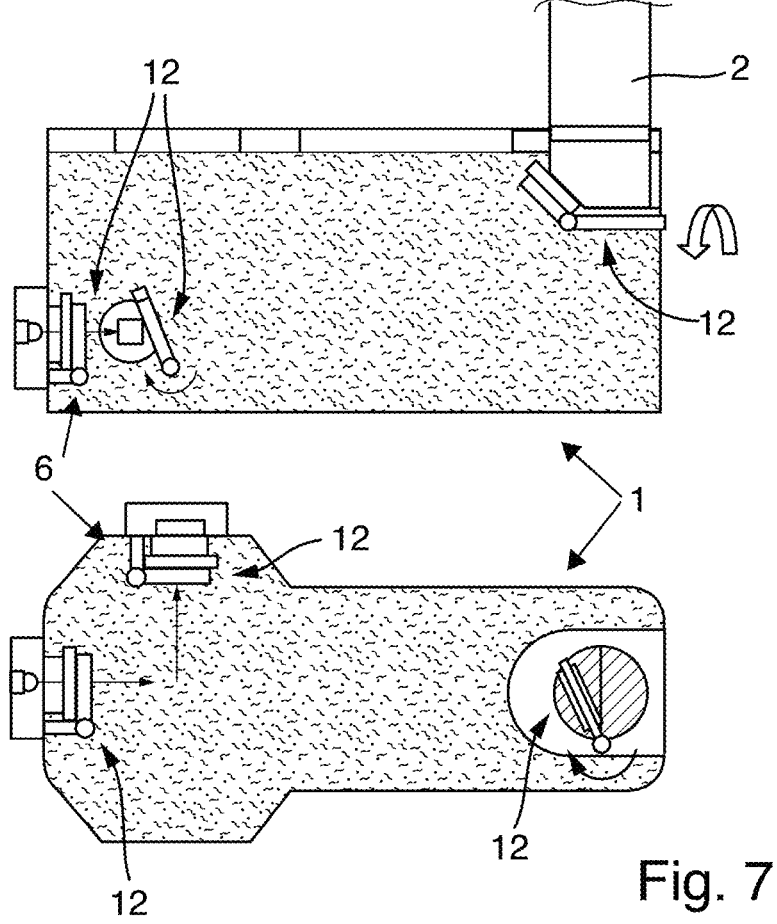
FIG. 7 shows the claimed calibration vessel comprising a plurality of cleaning units.

In order to prevent impairments or measurement errors during measurement of the reference as a result of impurities or deposits of the calibration medium 5, the optical windows 13 of the turbidity measurement 6 integrated into the calibration basin 1 or of the external reference sensor 7, as well as of the sensor 2 to be calibrated, are equipped with a cleaning unit 12; see FIG. 7. This cleaning unit is 12 designed as a wiper, as a brush, as an air cleaning system, as an ultrasonic cleaning system or as a combination of these cleaning options and can either take place manually by the operator or automatically, for example via a time-controlled motor. The control can take place via the transmitter 15.

Figure 8:
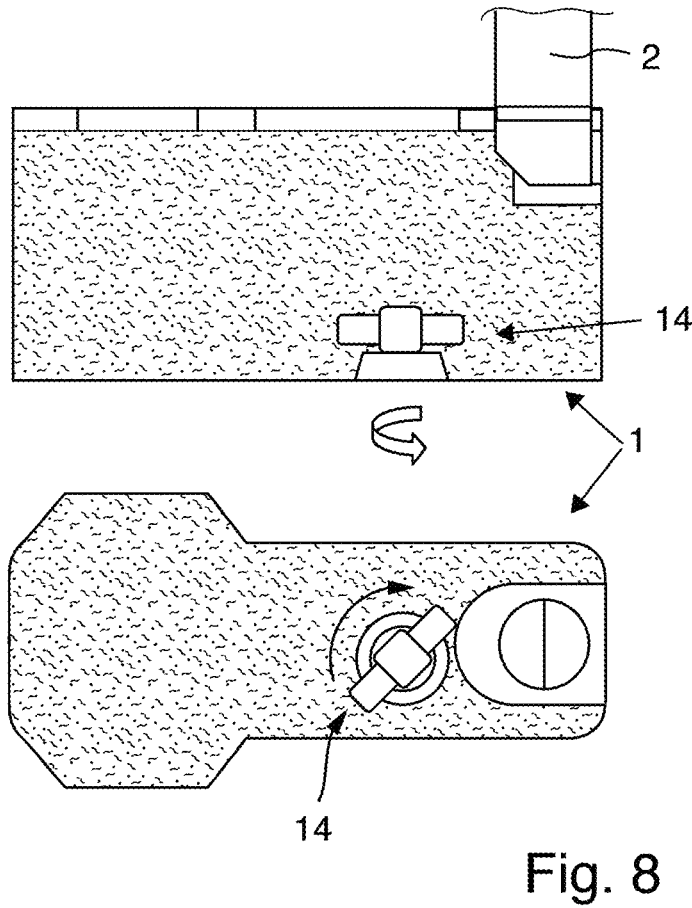
FIG. 8 shows the claimed calibration vessel comprising a circulation system.
Figure 9:
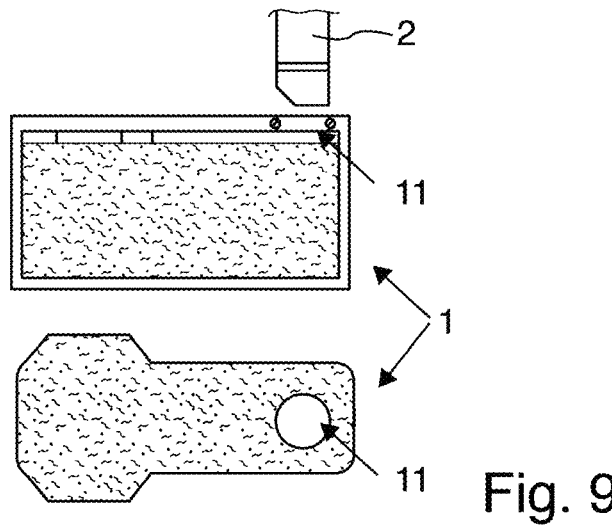
FIG. 9 shows the claimed calibration vessel comprising a sealing system.

In order to ensure a homogeneous calibration solution in the calibration vessel 1, a circulation system 14 (e.g., a stirrer, magnetic stir bar, etc.), which is actuated manually by the operator or automatically, for example by means of a time-controlled motor, can be integrated in the calibration vessel 1; see FIG. 8. The control can take place via the transmitter 15.

With a corresponding shape of the calibration vessel 1a, suitable design of the cleaning units 12 can also ensure the circulation of the calibration medium and thus a homogeneous calibration medium.

Alternatively, the basin filled with calibration solution 5 and sealed can be manually shaken, turned, or agitated in another way prior to use in order to thereby mix and homogenize the calibration solution 5.

As an additional option, a calibration solution 5 can be used, which, due to its composition or its physical properties, does not settle and remains permanently suspended. (e.g., styrene-divinylbenzene, SDVB).

Voltage can be supplied to the elements described above (integrated sensor unit, monitoring and display unit, cleaning system, stirrer, etc.) either internally via a battery or via an external voltage source.

In order to minimize contact between operating personnel and calibration solutions that are harmful to health (e.g., formazine) during the calibration process, the calibration vessel 1 comprises a sealing system 11 having a cover or a film, as a result of which the opening 4 is covered or sealed.

The opening for introducing the sensor to be calibrated can in this case be sealed by additional sealing systems (e.g., O-ring seal, membrane, etc.).

Ideally, the calibration vessel is already filled with the calibration solution 5 at the factory and the complete system is hermetically sealed using a cover or a film. For calibration purposes, only the sensor 2 to be calibrated must be introduced into the calibration medium 5. In one embodiment, for example, a membrane 11 can be pierced with the sensor 2 for this purpose.

In order to use the calibration vessel 1 several times, the calibration solution 5 can be replaced either by removing the cover, via the opening for introducing the sensor or via additional, sealable basin openings (e.g., inlet and outlet valve). A replacement may be necessary if the service life of the calibration solution specified by the manufacturer has elapsed or its turbidity value is outside the permissible limits during the check. In this case, the calibration vessel is emptied, cleaned and then filled with new calibration solution. The turbidity value of this new calibration solution 5 is then checked using the internal monitoring unit 6 or an external reference sensor 7. The calibration vessel 1 is thus not only suitable for single use but can be reused several times without the accuracy or quality of the calibration/adjustment process being reduced by reusing said vessel.

The invention claimed is:

1. A calibration vessel for an optical immersion sensor to be calibrated, which is designed for measuring, calibrating and/or adjusting a measured variable, comprising:

a housing having a repeatably tightly sealable opening for introducing the optical immersion sensor;

wherein the housing comprises a calibration solution in the interior thereof:

wherein the housing provides the value for the calibration solution;

wherein the opening comprises a guide for aligning and positioning the optical immersion sensor to be calibrated in relation to all possible spatial degrees of freedom;

wherein the housing is designed such that the influence of the interactions between the light, emitted and received by the sensor, and the housing wall, in particular as a result of scattering, absorption, reflection, phosphorescence and fluorescence, on the measured value that can be ascertained by the sensor is minimal;

wherein the volume of the calibration solution is minimized at the same time.

2. The calibration vessel according to claim 1,
wherein the calibration vessel provides the value for the calibration solution by the value being specified on the calibration vessel or on the housing as a nominal value, in particular by means of a sticker.

3. The calibration vessel according to claim 1,
wherein the calibration vessel provides the value for the calibration solution by the absolute value of the calibration solution being detected using a reference device that can be connected to the calibration vessel and is designed to monitor the calibration solution for changes or deviations with respect to a reference value.

4. The calibration vessel according to claim 3,
wherein the reference device is an external sensor, in particular a further immersion sensor that is structurally identical to the optical immersion sensor to be calibrated, wherein said further immersion sensor is already calibrated.

5. The calibration vessel according to claim 3,
wherein the reference device is fixedly arranged on or in the calibration vessel.

6. The calibration vessel according to claim 5,
wherein the reference device is arranged on the outside of the housing.

7. The calibration vessel according to claim 3,
wherein the immersion sensor and the reference device have contact with the interior of the housing and thus the calibration solution via an optical window thereon.

8. The calibration vessel according to claim 3,
wherein the reference device is a turbidity meter designed as an absorption sensor.

9. The calibration vessel according to claim 3,
wherein the reference device is a turbidity meter designed for backscatter measurement, in particular comprising a light source, for example an LED, for emitting outgoing light and a photodiode integrated therein for receiving incoming light, wherein the outgoing light is converted into incoming light by the calibration solution.

10. The calibration vessel according to claim 3,
wherein the reference measuring device is a turbidity meter designed for 90° scattered light measurement.

11. The calibration vessel according to claim 1, comprising a display unit, which is connected to the reference device and is designed to display the measured value for the measured variable ascertained by the reference device as changes or a deviation with respect to a reference value and/or as an absolute measured value; the display unit in particular comprises one or more LEDs or a display for displaying a numerical value.

12. The calibration vessel according to claim 1,
wherein the surfaces, angles, transitions, bevels and radii of the housing are designed such that light emitted by the turbidity sensor is refracted away therefrom.

13. The calibration vessel according to claim 1,
wherein the housing, in particular the interior of the housing, consists of a non-reflective, in particular black, non-glossy and/or matte, material.

14. The calibration vessel according to claim 1,
wherein the opening for introducing the immersion sensor comprises a guide having a stop, the guide being designed such that the immersion sensor is guided by the guide to the stop as an end position so that it is positively fixedly fixed, positioned and aligned in the stop in all three spatial directions (x, y, z).

15. The calibration vessel according to claim 1,
wherein the housing is designed such that the distance between the guide and the opposite wall is large enough that the wall has no influence, or as little influence as possible, on the measured value.

16. The calibration vessel according to claim 1,
wherein the opening for introducing the immersion sensor comprises a sealing system having a cover, a film or a membrane.

17. The calibration vessel according to claim 16,
wherein the opening is designed to be repeatably sealable by means of the sealing system.

18. The calibration vessel according to claim 16,
wherein the sealing system comprising the cover, film or membrane is designed to be pierced before first use.

19. The calibration vessel according to claim 1, comprising one or more cleaning units for the immersion sensor to be calibrated and/or the reference device, which in particular clean the optical window(s).

20. The calibration vessel according to claim 19,
wherein the cleaning units are designed as a wiper, brush, air cleaning system, ultrasonic cleaning system or as a combination thereof.

21. The calibration vessel according to claim 1, comprising a circulation system in the housing, in particular a stirrer, magnetic stir bar or the like, which is designed to circulate the calibration solution.

22. The calibration vessel according to claim 1, comprising a transmitter for controlling the calibration process and for performing an adjustment process, the transmitter being connected to the reference device, in particular also being connected to the immersion sensor, and for actuating the display unit, for controlling the cleaning unit and/or for controlling the circulation system.

23. A method for calibrating an optical immersion sensor using a calibration vessel, wherein:

the calibration vessel is for an optical immersion sensor to be calibrated, which is designed for measuring, calibrating and/or adjusting a measured variable, comprising:

a housing having a repeatably tightly sealable opening for introducing the optical immersion sensor;

wherein the housing comprises a calibration solution in the interior thereof:

wherein the housing provides the value for the calibration solution;

wherein the opening comprises a guide for aligning and positioning the optical immersion sensor to be calibrated in relation to all possible spatial degrees of freedom;

wherein the housing is designed such that the influence of the interactions between the light, emitted and received by the sensor, and the housing wall, in particular as a result of scattering, absorption, reflection, phosphorescence and fluorescence, on the measured value that can be ascertained by the sensor is minimal;

wherein the volume of the calibration solution is minimized at the same time;

the method comprising the steps of:

homogenizing, in particular circulating, the calibration solution in the calibration vessel, in particular during the entire method;

determining the measured variable for the calibration medium using the reference device or by reading the value specified on the calibration vessel or the housing;

determining the measured variable for the calibration medium using the immersion sensor; and calibrating and/or adjusting the immersion sensor by comparing the measured value of the reference device, or the value specified on the calibration vessel or the housing, with the measured value of the immersion sensor.

24. The method according to claim 23, wherein, before the step "determining the measured variable for the calibration medium using the reference device," the following step is performed:

cleaning the reference device and/or the immersion sensor, in particular cleaning the optical window(s) for the reference device and/or the immersion sensor.

* * * * *